United States Patent [19]
Gilligan et al.

[11] Patent Number: 5,438,331
[45] Date of Patent: Aug. 1, 1995

[54] COMPUTER KEYBOARD WITH DIAL FOR ENTERING REPETITIVE DATA AND COMMANDS

[76] Inventors: Federico G. Gilligan; Fernando D. Falcon, both of Lavalle 682, 1047 Buenos Aires, Argentina

[21] Appl. No.: 75,770

[22] Filed: Jun. 11, 1993

[30] Foreign Application Priority Data

Aug. 21, 1992 [AR] Argentina ............................... 323028

[51] Int. Cl.⁶ .......................................... H03M 11/08
[52] U.S. Cl. ........................................ 341/35; 341/20; 341/31; 345/168; 345/170; 400/479
[58] Field of Search .......................... 341/20, 35, 31; 200/5 A, 6 A; 400/472, 477, 479, 615.2; 345/156, 160, 167, 168, 166, 170

[56] References Cited

U.S. PATENT DOCUMENTS

| | | | |
|---|---|---|---|
| 4,266,452 | 1/1981 | Chandler | 200/5 A |
| 4,846,597 | 7/1989 | Bryant et al. | 341/35 |
| 4,970,512 | 11/1990 | Wood | 341/35 |

*Primary Examiner*—John K. Peng
*Assistant Examiner*—Daniel J. Wu
*Attorney, Agent, or Firm*—Michael J. Striker

[57] ABSTRACT

The computer system includes a keyboard having a plurality of keys mounted in a supporting frame; a scanning device for sensing activation of keys; a processing device for generating commands and data units from status changes of the keys; a communication device for transmitting the generated commands and data units from the processing device; a rotatable dial having a center, a rotation axis passing through the center and an exposed operating surface and rotatably mounted in the supporting frame so as to be rotatable by contact of at least one finger of an operator with the operating surface at a plurality of radial positions spaced from the center of the dial; a rotational transducer device for generating an output signal according to an angular rotation speed of the dial in predetermined incremental angular units; a device for generating the sequences of repeated commands and data units from this output signal and a device for modifying the sequences of repeated commands and data units by activation of the keys when the dial is rotated by the operator.

9 Claims, 8 Drawing Sheets

COMPUTER KEYBOARD WITH DIAL FOR ENTERING REPETITIVE DATA AND COMMANDS

BACKGROUND OF THE INVENTION

This invention relates to computer input devices, in particular to keyboards. A computer keyboard generally comprises a plurality of keys mounted on a substantially horizontal panel, for entering commands and data units (i.e., characters) into a computer or computer display terminal. Each key is mechanically engaged with a binary switch (i.e., on-off switch) configuring a switch array that is periodically scanned by an electronic circuit to sense the key's status and transmit a corresponding code (called scan code) to a computer system, when a change in the switch array status is detected.

This invention relates to a new computer keyboard comprising additional non-binary means to improve the working condition of a keyboard operator and accelerate some tasks during operation of computer programs.

Computer keyboards are used in almost any kind of computer application. Compared to other computer peripherals, computer keyboards have not evolved significantly from the first specimen up to the present state of the art, the only changes being limited to varying key layouts and modifications in key shapes and switching mechanisms. At the time of the present invention, we know of no significant keyboard improvements on operational features or functional enhancements.

Computer keyboards generally include: a first group of alphanumeric keys, used for entering textual, numeric and punctuation data, a second group of keys generally called "control keys", used for controlling some program functions implemented in most of the contemporary programs (e.g., HOME, END, PAGE UP, DELETE, etc.), a third group comprising general purpose keys, also known as "function keys" (generally labeled F1, F2, F3, etc.) and a fourth group comprising a set of four keys generally called "arrow keys", generally used to select an item from a list, control a cursor's position, etc. In almost all computer keyboards, a special control key generally labeled "ENTER" is also provided, usually used to communicate the computer that a certain data entry or control task is completed.

In normal operation of a computer keyboard, communication between operator and machine comprises tasks that may be grouped in two main groups:

1. Data entry tasks, and
2. Control and command tasks.

In operating many contemporary programs using a computer keyboard, a significant portion of the tasks included in the second group require intensive use of a certain group of keys, generally in a repetitive fashion, in bursts of repeated activation of a single key. This group of keys mainly comprises the arrow keys, and secondly the control and function keys. Moreover, the repetitive bursts generally appear as a sequence of several bursts of repeated activation of keys that have functions inverse to each other (e.g., PAGE UP/PAGE DOWN, ARROW LEFT/ARROW RIGHT, SPACE FORWARD/BACK SPACE, etc.), usually within a successive approximation to a final state.

This phenomenon may be observed in almost any kind of modern computer application, but mainly in highly interactive applications running in personal computers, like programming, text editing, spreadsheet editing, etc. This is primarily because user interfaces had evolved from command line keyword oriented interfaces to more friendly, visual feedback interfaces controlled by a limited group of keys (or alternatively by another kind of computer input device e.g., a mouse).

For example, in former editing applications, a special screen area was assigned to enter program commands by typing one or more keywords in it. However, contemporary editing applications tend to use a single key to switch a main menu displaying all available command options, and a particular command can be selected by typing the arrow keys repeatedly until a desired option is highlighted. This interface concept has been almost uniformly adopted in the software industry.

On the other hand, when tasks included in the first group are performed, this phenomenon is not as frequent, because the statistical distribution of alphanumeric keystrokes in most applications is substantially constant so that the probability of repeated keystrokes of the same key is far lower.

We have also observed that repeated activation of the same key in a computer keyboard causes an uncomfortable tension in the operator's hands and wrists that frequently causes fatigue in the operator and results in productivity loss. It is believed that this tension excess is due to the lack of movement compensation between fingers and other parts of the hand when performing repetitive typing. This belief is supported by the fact that this tension does not appear when typing for example a piece of text, which normally has a relatively constant letter probability function.

A widely used approach for this problem is the auto-repeat method (generally called "typematic") implemented in almost all computer keyboard application. The auto-repeat method consists in automatically repeating the scan code corresponding to the key being pressed at a fixed rate, when the key is kept pressed at least for a pre-determined time period.

Although it represents an improvement, significant enough for it to become widely accepted, this method is not all that comfortable and efficient, mainly because the auto-repeat rate is given by a fixed time reference and hence it is not capable of providing speed and precision simultaneously. That is, a high auto-repeat rate sacrifices precision and a low one gives good precision but is slow. This unavoidable speed-precision trade-off leads the operator back to repetitive typing because usually it is the only way to get enough precision in most tasks. Moreover, throughout a certain computer operation session, different auto-repeat velocities are needed depending on the particular task being performed; this is a requirement not satisfied by the auto-repeat method which lacks this flexibility. Still another disadvantage of the auto-repeat method is that the initial period preceding the auto-repetition function produces some uncertainty in the number of repetitions generated. This is because if the delay is too short it may produce undesired keystrokes, and if it is too large, it produces an uncertainty about the instant in which the repetition will begin, reducing the chances of precise control even more.

This accumulation of effects leads average keyboard operators to perform, or at least complete, a lot of operation with repetitive typing, since it appears as mentally less distressing although, in the long run, it strains one physically and psychologically, perhaps unconsciously.

Consequently, there is a need of an improved computer keyboard, capable of performing this kind of operations more efficiently, to improve the work conditions of a computer keyboard operator and enhance productivity.

SUMMARY OF THE INVENTION

It is a basic object of the present invention to improve the work condition of a computer keyboard operator, replacing vertical up and down finger and hand movements (due to repetitive typing) with a more ergonomic and comfortable movement.

Another object of the present invention is to reduce time spent in some tasks while operating a computer program with a keyboard.

Another basic object of the present invention is to improve the user interface provided by a computer keyboard, by enhancing its command and data entering capabilities.

Another object of the present invention is to reduce the risk of hand, finger and wrist diseases associated with computer keyboard operation, by providing an improved and more ergonomic way of entering repetitive commands and data.

Another object of the present invention is to provide an improved keyboard having all the features stated above that can be manufactured at a substantially low incremental cost.

Another object of the present invention is to provide a computer keyboard having all the features stated above but substantially maintaining the format and operating characteristics of a conventional keyboard.

According to the invention, the improved keyboard having the features set forth above comprises a conventional keyboard in which the fixed time reference of the auto-repeat function has been replaced by a manually generated timing signal through operation of a dial engaged with a rotation transducer.

The dial is rotatably mounted with its rotation axis substantially perpendicular to the keyboard plane, exposing one of its surfaces so as to be engagable a finger of an operator's hand at a number of radial positions spaced from its center, so that the sensitivity of the device, i.e., response per finger travel distance, depends on the radial position contacted. In other words, the farther the radial position of finger contact from the center of the dial, the less sensitive the response to a given amount of finger travel.

From the output of the rotation transducer, a pulsing signal is derived indicative of the angular speed of the dial measured in predetermined incremental angular units, plus an additional binary signal indicative of the sign of the rotation (i.e., clockwise or counterclockwise). The dial can be rotated without limit and operated in combination with one or more keys for entering bursts of repeated commands and data units to a computer, the number of repetitions as well as the repetition rate being under tight control of the operator. Furthermore, the dial can be rotated back and forth to switch two scan codes associated with each key, so that the scan code generated in repetition mode is dependent on the dial rotation direction, enabling fast switching between two different commands associated with a single key (useful for commands having inverse responses to each other).

Auxiliary keys may be used in combination with the dial for performing special functions. A pair of default scan codes can be generated when the dial is rotated without pressing any key, for fast issuing of very frequently used commands.

DESCRIPTION OF PREFERRED EMBODIMENTS

Figure 1:
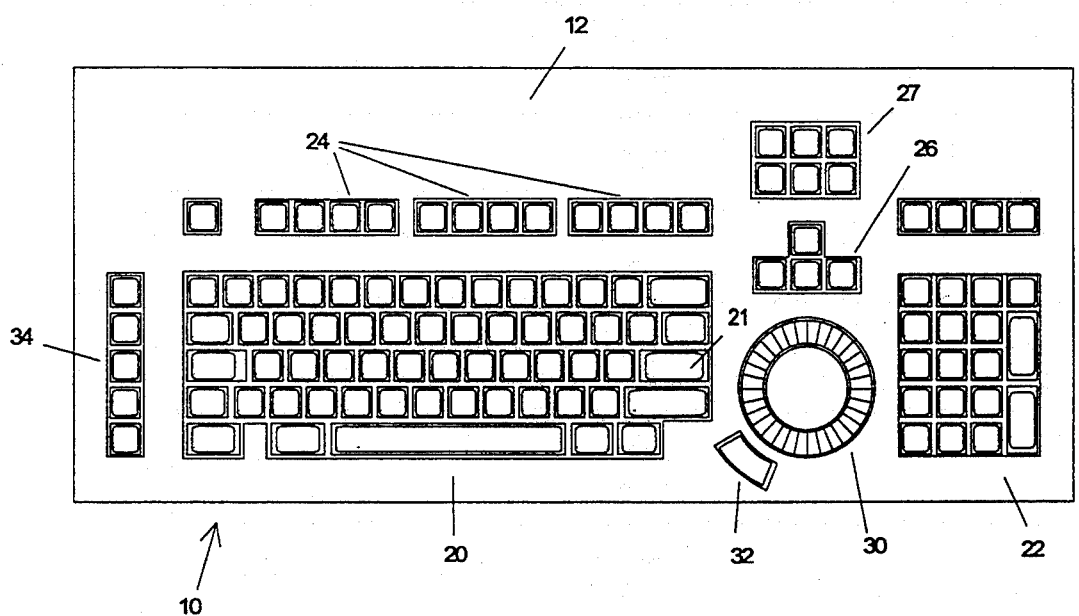
FIG. 1 is a plan view of a personal computer keyboard incorporating a dial and other features according to a preferred embodiment of the invention.

FIG. 1 shows a preferred embodiment of a keyboard 10 according to the invention, based on a typical key layout widely used in PC keyboards. In particular, the keyboard 10 includes keyboard supporting frame 12, a main alphanumeric pad 20, a numeric panel 22 located to the right of panel 20, generic function-key panel 24 placed above the main panel 20, arrow key panel 26 and control key panel 27 placed between the main panel 20 and the numeric panel 22.

According to the present invention, the keyboard 10 includes a rotatable dial 30 mounted on keyboard frame 12 with its rotation axis 29 oriented substantially perpendicular to the plane defined by the key panels, which may freely rotate with relatively little friction. In the preferred embodiment, the keyboard 10 also comprises an auxiliary key 32 for switching a pair of scan codes associated with very frequently used commands, specially shaped to be operated by the thumb of the operator's hand in a way that both dial 30 and key 32 can be simultaneously operated with the thumb and fingers of the same (e.g. right) hand. Also shown in FIG. 1 is an extra key set comprising auxiliary keys 34 used for switching special scan codes associated with special commands or functions. In the preferred embodiment, this set of keys 34 is placed on the left-hand side of the keyboard 10 so as to be operable by the other (left) hand of an operator.

Figure 2:
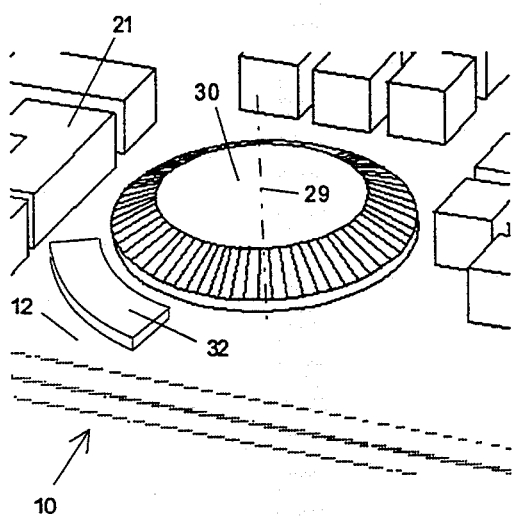
FIG. 2 is an enlarged perspective view of a portion of the keyboard of FIG. 1 including the dial.
Figure 3:
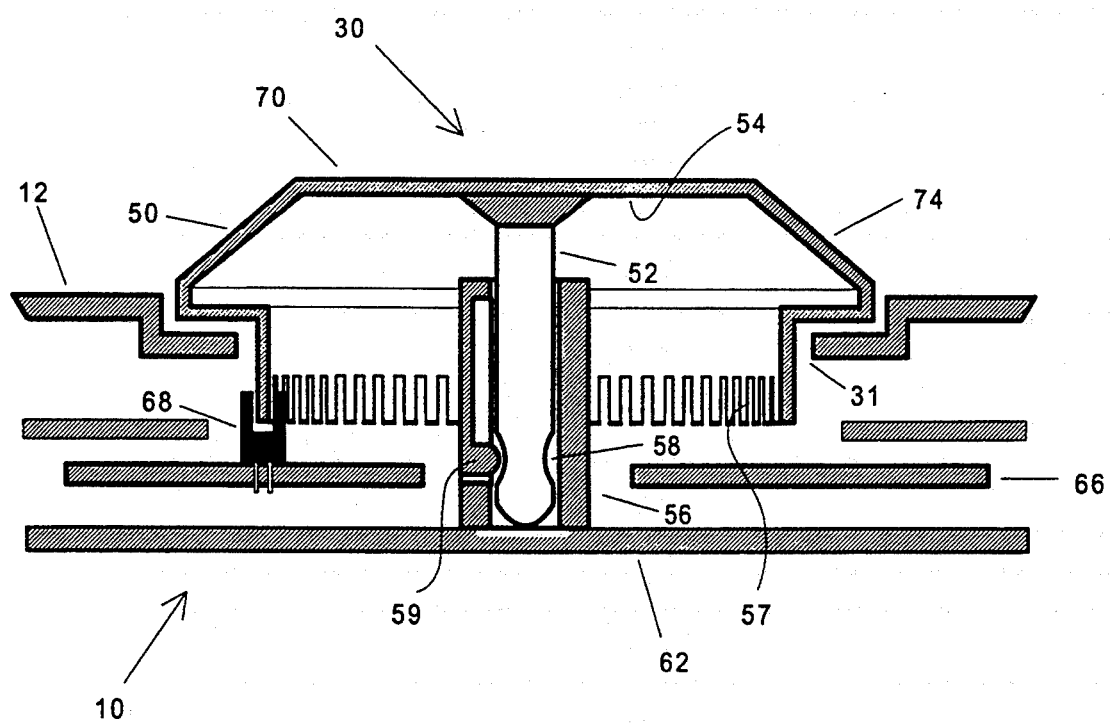
FIG. 3 is a cross-sectional view of the dial according to an embodiment of the invention.

FIG. 2 shows a more detailed view of the dial 30 and the auxiliary keys 32, mounted on the keyboard frame 12 and surrounded by the main key panel 20, the arrow keys panel 26 and the numeric key panel 22, thus configuring an advantageous arrangement as will be explained further on herein. As illustrated in FIG. 3, the dial 30 is mounted over a stepped opening 31 in the top 13 of the keyboard housing. The opening 31 has a concentric outer step where dial 30 just fits in so as to keep dust from getting inside the keyboard housing 10.

FIG. 3 also shows a preferred embodiment of the dial and rotational transducer advantageously using a single piece of material and taking advantage of computer keyboard structures well known in the art. The dial 30 may be manufactured as a knob 50 shaped with an elevated top flat portion 70 and a sloped conical peripheral portion 74 so as to approximately fit in a human palm for easy and reliable manipulation of the dial 30 with any or all fingers of the right hand of the operator. Since the conical portion 74 was conceived to allow a precise and slow operation of the dial, it has proven useful to use a rugged surface or a plurality of protruding elements as radial strips or the like. However, for the central portion 70, a polished surface (e.g., acrylic) is preferable, since it allows a perfect tracking and at the same time provides a smooth and uniform contact surface.

Inside, the dial 30 comprises a shaft 52 posted on the center of internal surface 54 of the knob part. The shaft 52 is mounted on a bushing 56, fixed to the bottom 62 of keyboard housing 10. The dial mounting preferably includes a circumferential recess 58 in the shaft 56 which receives a resilient latch 59 so that together they hold the dial 30 in place on the keyboard. This mount has the advantages that, for one, it is easy to insert and remove, enabling nearly instant mounting in the keyboard manufacture and assembly process and, furthermore, features low static friction which gives it just the right resistance so that it can be easily and precisely turned by the operator with hardly any effort.

Going back to the shape of the dial 30, the conical portion 74 folds back at the outer edge and then downwards at a right angle to form a lower cylindrical skirt 57 which is supported above a printed circuit board 66. The bottom edge of the skirt 57 is slotted so as to form a continuous line of rectangular openings all the way round the skirt 57.

As is conventional, this circuit board 66 houses the electronics which interface the computer keyboard 10 with a port of the computer system. According to the preferred embodiment of this invention, the circuit board 66 also supports a pair of opto-couplers 68 (only one of which can be seen in FIG. 3) for sensing dial rotation. More precisely, the opto-couplers 68 are placed on the board 66 relative to the opening 31 so that the cylindrical skirt 56 fits into opto-coupler gaps. Thus, any rotation of the dial 30 results in passage of openings through the opto-coupler gaps. Each of the opto-couplers 68 issue pulse trains contains information regarding direction, rate of turn and incremental angle of turn.

Figure 4:
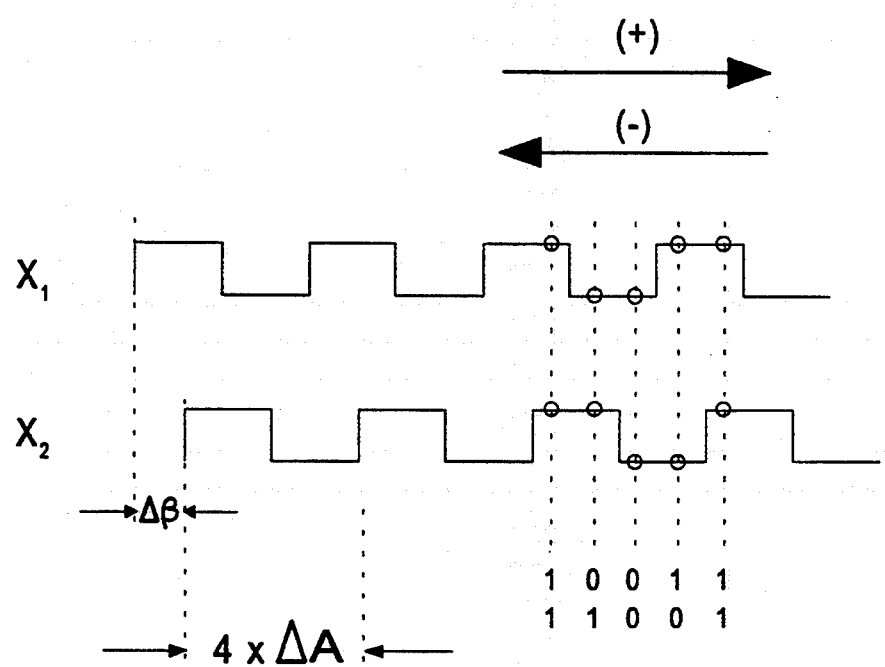
FIG. 4 is a time-chart showing binary signal waveforms and phase relationships at the output of the transducer associated with the dial.
Figure 5:
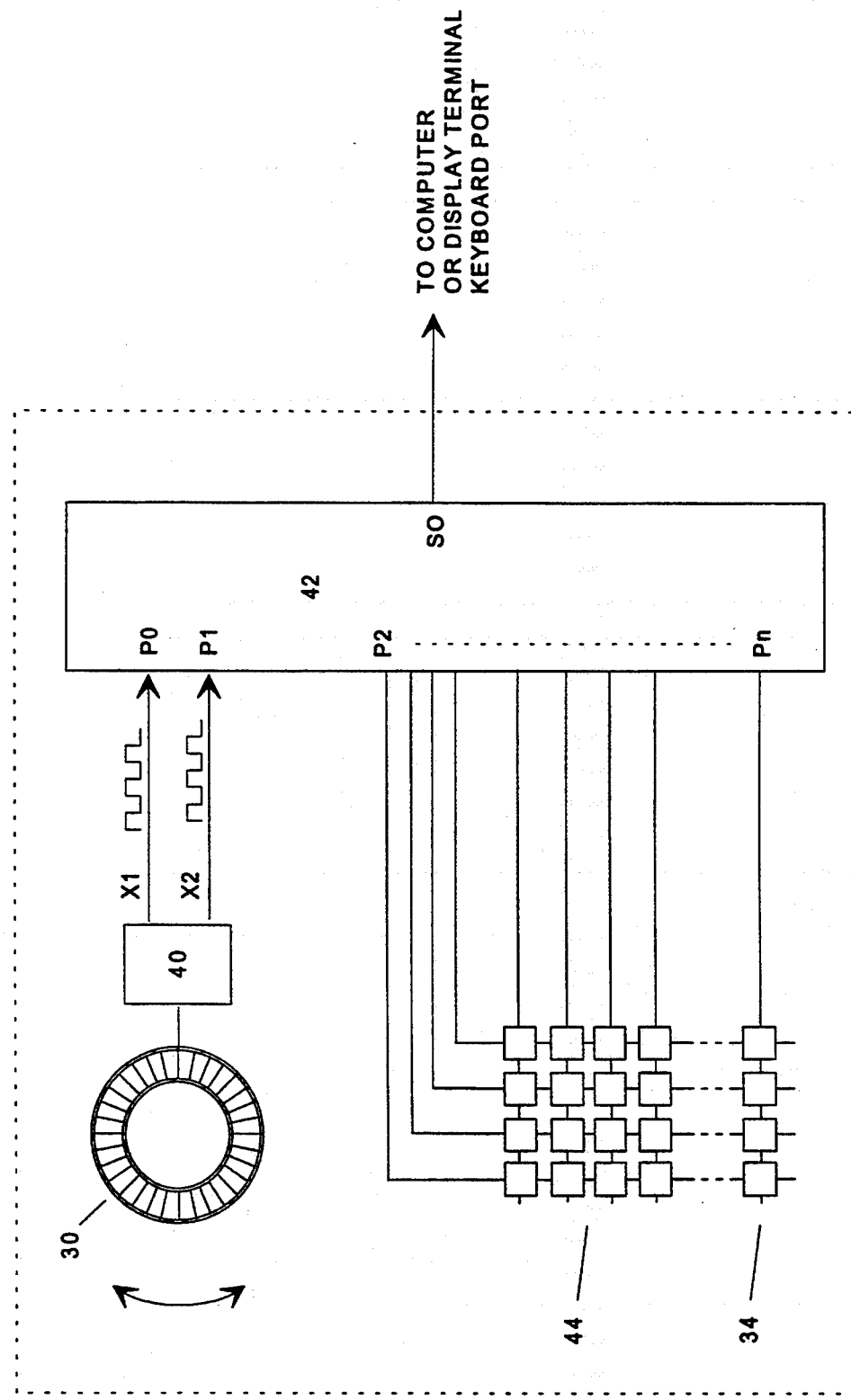
FIG. 5 is a block diagram of the keyboard of the invention, including the dial and associated transducer hardware according to a first embodiment of the invention.

Therefore, the slotted skirt 57 together with opto-couplers 68 form a rotational transducer 40 represented in the block diagram of FIG. 5. As the dial 30 is rotated, the opto-couplers 68 generate a pair of signals X1-X2, representing signed incremental rotational movement of dial 30. The opto-couplers 68 are mounted on printed circuit board 66, for instance by soldering, at two angularly spaced locations relative to the dial shaft 52 as to generate synchronous quadrature pulse signals according to a widely known rotation transducer technique as displayed in FIG. 4.

Each quarter cycle of signals X1-X2 represents an elementary angle DA according to a predetermined resolution. As can be seen in FIG. 4, the variation of the signal status taken together in each quarter cycle gives all the motion information. A change in the status of signals X1-X2 at two different points in time defines a transition and provides motion direction information as summarized in Table 1 herein below.

TABLE 1

| $X1_n, X2_n$ | $X1_{n+1}, X2_{n+1}$ | Motion Direction |
|---|---|---|
| 00 | 00 | 0 |
| 00 | 01 | −1 |
| 00 | 10 | +1 |
| 00 | 11 | x |
| 01 | 00 | +1 |
| 01 | 01 | 0 |
| 01 | 10 | x |
| 01 | 11 | −1 |
| 10 | 00 | −1 |
| 10 | 01 | x |
| 10 | 10 | 0 |
| 10 | 11 | +1 |
| 11 | 00 | x |
| 11 | 01 | +1 |
| 11 | 10 | −1 |
| 11 | 11 | 0 |

In Table I, the column marked "$X1_n, X2_n$" represents the signal status prior to detection of the transition and the column marked "$X1_{n+1}, X2_{n+1}$" represents the status after transition. The third column shows the incremental signed value of the motion detected. Transitions marked with an "x" are not possible in the scheme of FIG. 5 and may be used as an error signal indicating a transducer malfunction.

FIG. 5 shows a block diagram of a preferred embodiment of the electronic circuit onboard the keyboard 10. As shown in FIG. 5, signals X1-X2 are read by parallel inputs P0 and P1 of logic circuit means 42, which processes the signals to detect the dial rotation according to Table I and calculate the angular units rotated according to a predetermined resolution. Logic circuit 42 derives an internal timing signal for each rotation angular unit detected for triggering transmission of the corresponding scan codes when a key is pressed (or the default scan codes if no key is depressed). Logic circuit 42 derives an additional internal binary signal indicative of the sign of the rotation, for selecting the corresponding scan code within the set of scan codes associated with each key, in accordance to the dial rotation direction, as will be explained further on herein.

In the preferred embodiment, the logic circuit 42 is the same means used for scanning key array 44 of keyboard 10, since it only requires the availability of input ports P0 and P1 and some extra programming to include the transition detection routines and link them to the already available scan code generating means and routines (naturally built into the circuit 42). Circuit 42 can be embodied by means of a microcomputer such as the Motorola 6809 with associated hardware for scanning the key array 44 and transmitting scan codes to the computer system. It will be apparent to those skilled in the art that all accessory elements and means are well known in the industry and are common practice in manufacturing today's computer keyboards. For instance, the key array 44 of FIG. 5 represents the set of keys of a conventional keyboard, including main alphanumeric panel 20, numeric panel 22, generic function keys panel 24, arrow keys panel 26 and control keys panel 27. Arrays 44 and 34 are cross-scanned by respective lines connected to generic input ports P2 through Pn of circuit means 42.

Figure 6:
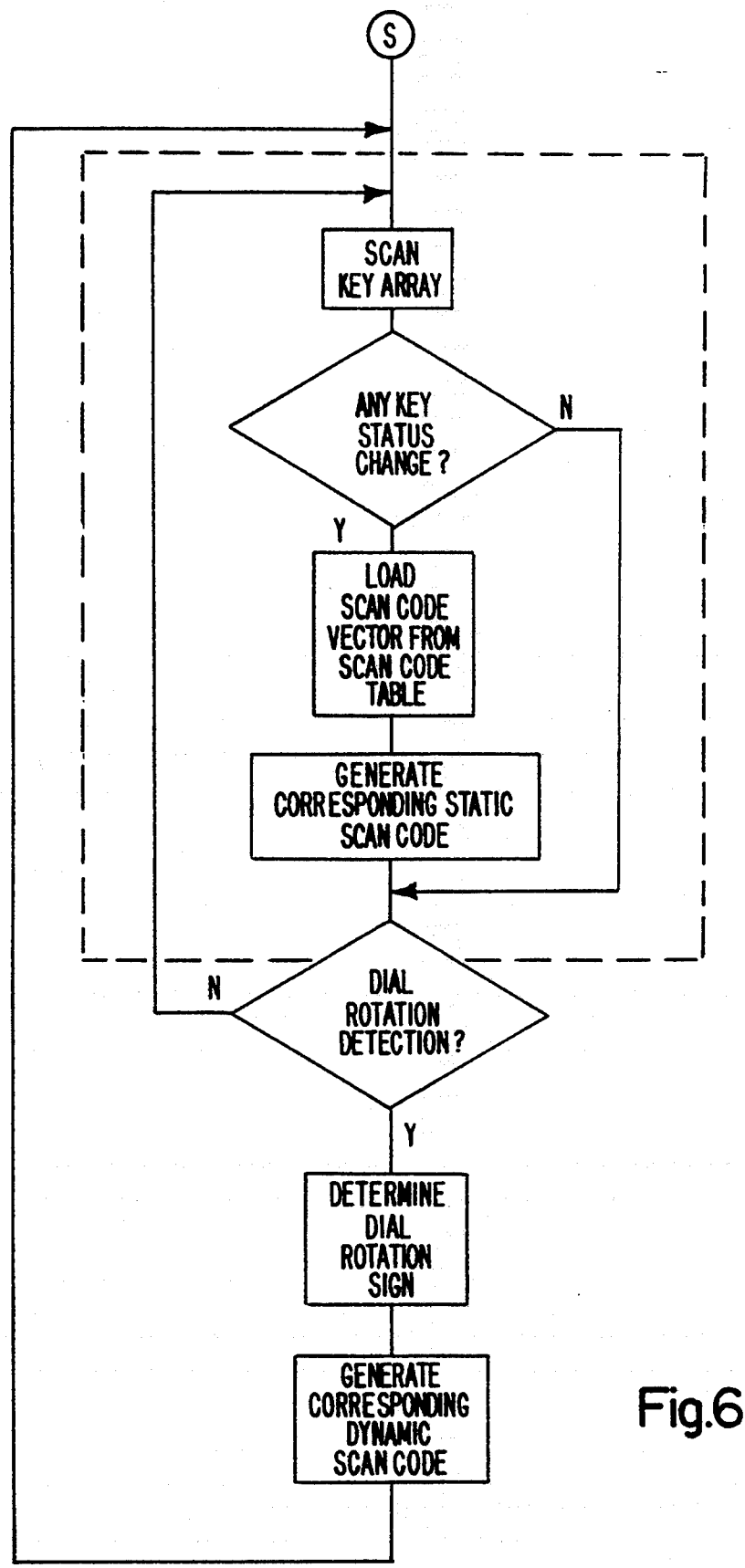
FIG. 6 is a flow-chart illustrating a program routine embodying the operational aspects of the keyboard of the invention.

FIG. 6 is a flow diagram of the functions carried out by circuit means 42. The part of the diagram inside the dotted line shows a method similar to that used in a conventional keyboard, the only difference being that in a conventional keyboard, only a single scan code is associated with each key, generated when a key status change is detected. In the keyboard 10 of the invention, however, each key is associated with more than one scan code, being the additional scan codes generated by the dial rotation and depending on the dial rotation direction. The scan code generated when a key is pressed without rotating the dial is called "static scan code", while the additional scan codes defined for the corresponding dial rotation directions are called "dynamic scan codes". Each time a key array 44 status change is detected, circuit means 42 looks up in a table the new scan codes according to the new activation status of key array 44 (keys pressed or released) and fills in a one-dimensional data structure called "scan code vector". When a key is pressed from a released position, circuit means 42 generates the corresponding static scan code. If the key is held in an active position and the dial is rotated, circuit means 42 generates repeatedly the dynamic scan code present in the scan code vector, according to the dial rotation direction and upon detection of each incremental angular unit rotated by the dial.

Table 2 shows an example of a possible scan code assignment table to illustrate this principle.

TABLE 2

| Key Label | Static Scan Code | Dynamic Scan Code (−) | Dynamic Scan Code (+) |
| --- | --- | --- | --- |
| TAB | 21 | 33 | 21 |
| SPACE | 6B | 7D | 6B |
| AUX 1 | — | 9C | B4 |

If the keyboard in which the invention is to be practiced is a double code keyboard (i.e., a keyboard that generates a first scan code when a key is pressed and a second scan code when the key is released) as is the case for example of contemporary "PC" keyboards, almost the same scheme may be implemented, the difference being that two scan codes are generated for each dial rotation transducer transition detected, with a suitable delay in between, so as to simulate repeated keystrokes of the same key while maintaining full compatibility with existing applications.

Moreover, Table 2 can be further enhanced to contain not only single scan codes, but a combination of them, so as to simulate repeated keystrokes of a key combination or macro rather than of a single key. For example, "TAB" and "SHIFT+TAB" can be assigned to a certain key of group 34, respectively as the positive and negative dynamic scan codes, so as to use the dial as an option selector in applications that use these key combinations for that purpose.

Although Table 2 has been dimensioned to contain scan code information for each key (i.e., the static scan code and both dynamic scan codes), it may be enhanced to contain additional key-specific information. For example, for some particular keys, a different effective resolution (i.e., the number of dynamic scan codes generated in a complete turn of the dial) may be desirable so as to reduce the dial's sensibility for that particular key. An example of this case is the "PAGE UP"—"PAGE DOWN" function, in which a user needs a certain time period between two successive commands so as to recognize the successive displayed images while browsing a certain file or document. This can be done by providing an additional column in Table 2 containing a number representing a different value of angular unit for each key.

Figure 8:
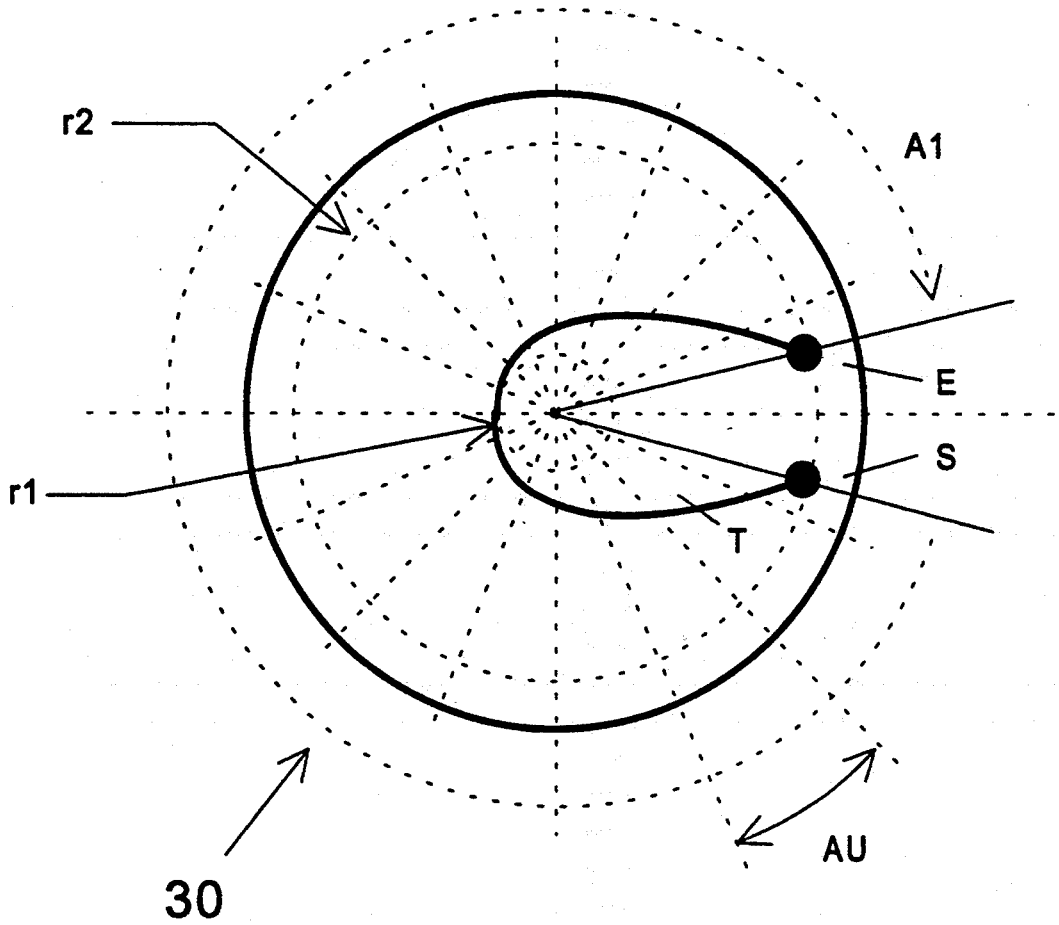
FIG. 8 is a schematic representation of a possible trayectory of a finger point of contact through a plurality of radial positions.
Figure 9:
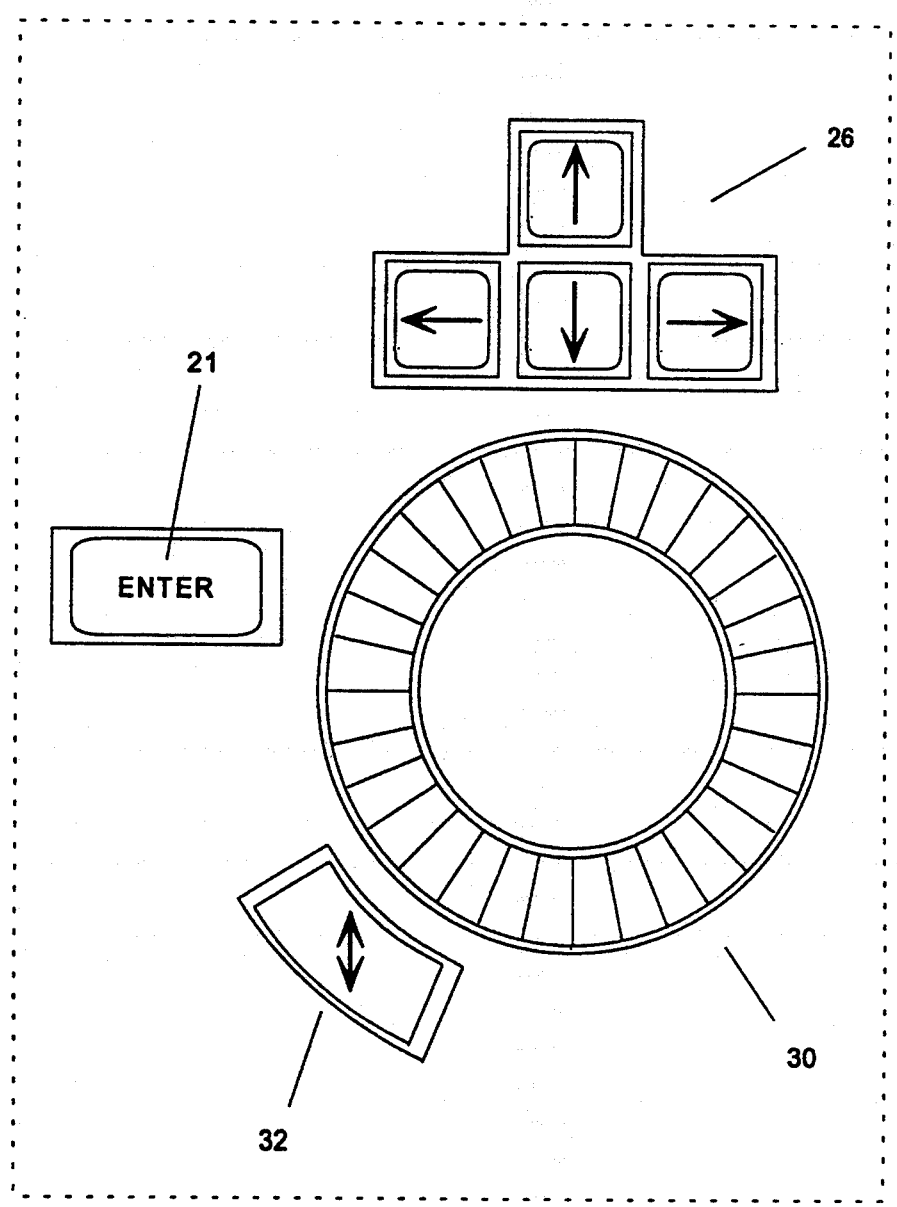
FIG. 9 is a plan view of the keyboard portion of FIG. 2, representing a particular arrangement according to a preferred embodiment of the invention.

If internal skirt 57 is dimensioned as to allocate for example 20 slots, a wide range of repetition rates may be easily obtained, from nearly zero (by operating the dial from its periphery) to approximately 200 Hz (by sliding the fingers towards the dial's center to gain rotational speed). This is illustrated in FIG. 8 sketching a clockwise rotation A1 during a repetition operation. An example of a finger point of contact trajectory has been represented as curve T in FIG. 8. As it may be seen in FIG. 8, to generate an approximately complete turn, a relatively small finger travel is required by turning the dial first sliding the finger from starting point S towards the center of the dial an further sliding the finger back towards the ending point E at the dial periphery. In this elementary operation performed very frequently while using the dial, since the point of contact evolves through a number of radial positions, from radial position r2 to radial position r1 and then back again to radial position r2, different angular velocities are obtained as the dial rotates a greater or lower number of angular units AU in a given period of time, therefore varying the repetition speed and the percieved effective resolution for a given point of contact travel. The result is that the operator can tightly control a certain repetition operation with both speed and precision at the same time, what in the long run results in a comfortably an efficient operation of the computer.

Moreover, if a wider repetition rate range is desired, the effective resolution may be varied dynamically to produce an acceleration effect. In other words, the function relating the number of rotation transducer transitions detected in a certain time period to the effective repetition timing signal cycles generated in the same time period may not be linear, so that a higher number of transitions detected produces an even higher effective repetition timing signal cycles, widening the effective repetition timing signal range. This can be done for example by dynamically altering the instantaneous angular unit as a function of the rotating speed of dial 30. The processing needed to perform the acceleration effect may be performed by circuit means 42, using routines widely known in the art. An additional advantage of implementing the acceleration effect is that it lowers the number of slots of skirt 57 and tolerances requirements in mounting of opto-couplers 68 and dial 30, while still allowing a relatively wide repetition rate range.

Figure 7:
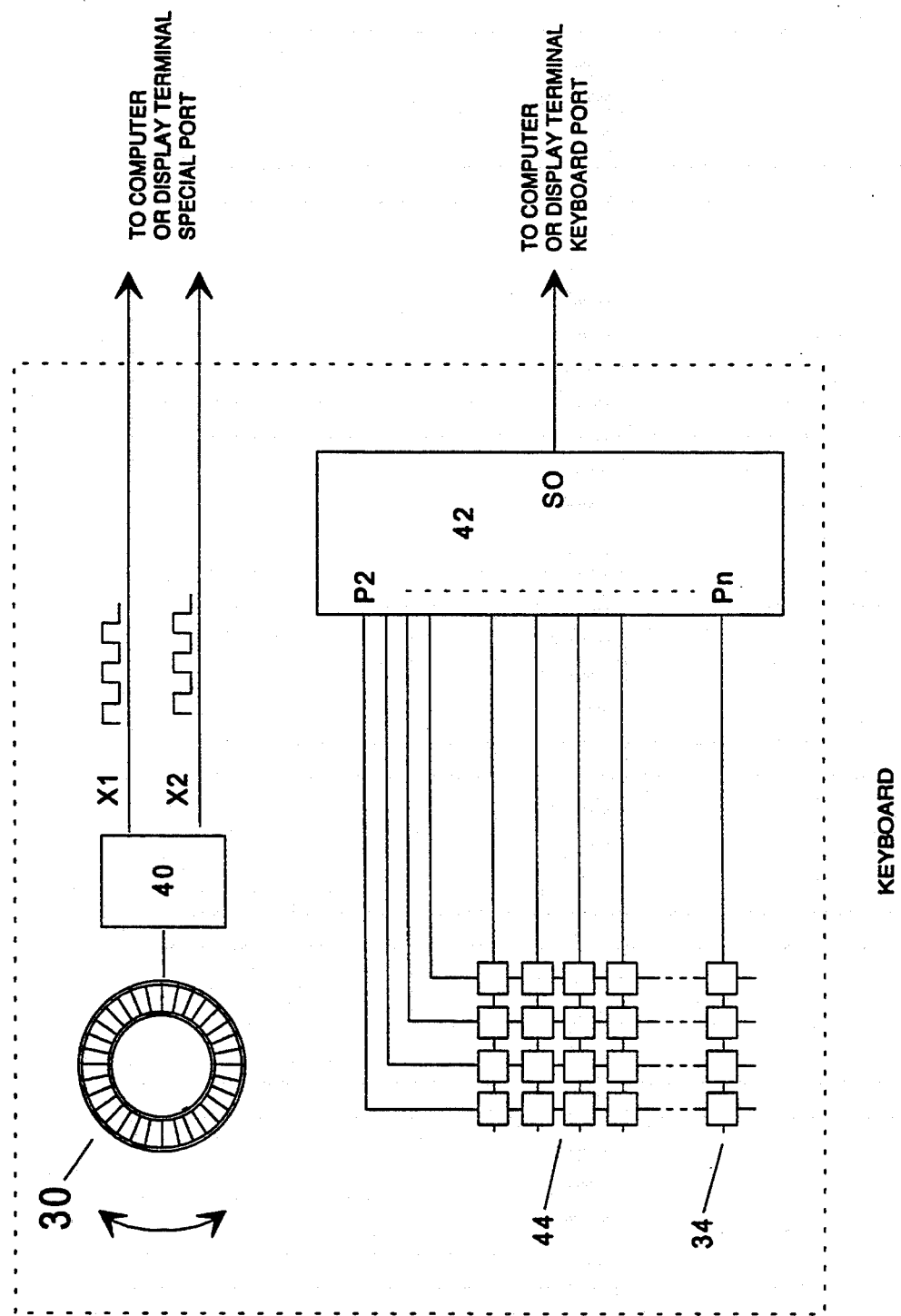
FIG. 7 is a block diagram of the keyboard of the invention, including the dial and associated transducer hardware according to a second embodiment of the invention.

In a second embodiment of the invention, the processing means that process the signals generated by the dial rotation transducer and perform the disclosed functions may be inside the computer system, as shown in FIG. 7. The advantage of this alternative embodiment, is that the scan code table can reside in the computer's memory and hence may be easily configurable for user customization. On the other hand, the disadvantage is that it is not independent of the computer operating system running in the computer and may not guarantee immediate 100% compatibility since modifications need to be introduced at operating system level so as to simulate repeated keystrokes upon dial rotation, in a way transparent to any application program running in the computer. On the other hand, in the first embodiment, the signals generated by the keyboard 10 when the dial is rotated are always identical to those generated by the effective activation of the physical keys, so that the keyboard of the first embodiment of the invention is fully transparent to any program running in the computer, even to the operating system itself.

In the preferred embodiments, the horizontal arrow keys scan codes are assigned as respective default dynamic scan codes, and the vertical arrow keys scan codes are assigned as respective dynamic scan codes of auxiliary key 32. With these assignments and since dial 30 and auxiliary key 32 are simultaneously operable, the combination of both elements behaves in some applications as a two-dimensional, one-dimension-at-a-time cursor control device of an extremely wide velocity range and of unlimited trajectory extent due to the operational characteristics of the dial mentioned herein before. For example, when editing a text file in a contemporary word processing application, activation of the right or left arrow keys causes a text cursor to shift from one character position to the next, respectively in a forward or backward direction. At that point, the dial 30 can be used as a right-left cursor control device, capable of traveling without limit and continuously the text file with significantly low effort and hand movement. Furthermore, if the auxiliary key 32 is pressed, the dial 30 can be used as an up-down cursor control device, shifting the cursor across successive lines of text allowing to reach any part of the text file in the same way.

Moreover, if both dial 30 and auxiliary key 32 are placed on the keyboard panel at the right of the ENTER key 21, as shown in FIGS. 1 and 8, the resulting arrangement inside the dotted line in FIG. 8 allows a fast, relaxed and efficient program control in many of contemporary computer applications, since most of them are based on the arrow keys and the ENTER key to control a significant part of the program flow. For example, in an application based in a pull-down menu structure, the dial may be first used to select a sub-menu by generating the horizontal arrow keys (default dynamic scan codes), and further used to select a certain command within the selected sub-menu by simultaneously pressing auxiliary key 32 to generate the vertical arrow key dynamic scan codes. When the desired command is reached, the ENTER key may be pressed to complete the selection. In this way, the dial 30 combined with auxiliary key 32 and the ENTER key work together as a program control device, eliminating the need for repeatedly pressing the arrow keys to navigate through the menu tree nodes and branches.

Furthermore, auxiliary keys 34 may be advantageously used to issue pairs of commands frequently used in a repetitive fashion and that have inverse effects to each other. For example, if the "Page Up" and "Page Down" keys scan codes are assigned to one of auxiliary keys 34 as its respective dynamic scan codes, when said key is pressed while the dial is rotated the dial behaves in many applications as a rotary scrolling device, very useful for browsing for example a long text file or data base file at the computer screen, allowing inspection of the file in a forward or backward direction efficiently and comfortably.

As another example, the scan codes of "DELETE" and "SPACE" keys may be assigned to another key of set 34 as its respective dynamic scan codes, allowing deletion of whole strings of characters as the dial is turned in a clockwise direction, and further inserting space characters when the dial is rotated in a counterclockwise direction.

Table 3 is an example of possible scan code assignments summarizing what has been disclosed.

TABLE 3

| Pressed Key | Dynamic Scan Codes | |
|---|---|---|
| | Negative Rotation | Positive Rotation |
| None (Default) | Left Arrow Key | Right Arrow Key |
| Auxiliary Key 32 | Up Arrow Key | Down Arrow Key |
| Aux. Key 34 (1) | Page Up | Page Down |
| Aux. Key 34 (2) | Space Bar | Delete Character |
| Aux. Key 34 (3) | Shift + Tab | Tab |
| Aux. Key 34 (4) | Generic Inverse Function | Generic Direct Function |
| Alphanumeric Keys | Back Space | Key's Static Scan Code |

While the invention has been illustrated and embodied in a keyboard comprising a dial for entering repetitive data and commands to a computer, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims:

1. In a computer system comprising a keyboard including a plurality of keys mounted in a supporting frame, scanning means for sensing activation of said keys, processing means for generating commands and data units from status changes of said keys as detected by said scanning means and communication means for transmitting said commands and said data units from said processing means; the improvement comprising a rotatable dial manually operable for production of sequences of repeated commands and data units, said dial being rotatably mounted in said supporting frame, having a center, a rotation axis passing through said center and an exposed operating surface and said dial being rotatable by contact of at least one finger of an operator with said operating surface at a plurality of radial positions spaced from said center; rotational transducer means for generating an output signal according to an angular rotation speed of said dial in predetermined incremental angular units; means for generating said sequences of repeated commands and data units from said output signal and means for modifying said sequences of repeated commands and data units by activation of said keys when said dial is rotated by said operator.

2. The improvement as defined in claim 1, wherein said supporting frame is substantially planar; said keyboard includes an alphanumeric key panel, an arrow key panel and a numeric key panel; said dial is mounted with said rotation axis substantially perpendicular to said frame and said dial is located adjacent to at least one of said key panels.

3. The improvement as defined in claim 2, wherein said dial is substantially circular and has a substantially flat circular elevated central portion to provide ease of access to any of said plurality of radial positions on said exposed operating surface of said dial and to provide different rotation speeds of said dial for equal finger travel rates.

4. The improvement as defined in claim 3, wherein said dial has a sloped substantially conical peripheral portion ergonomically adapted to a human hand to ease operation of said dial.

5. The improvement as defined in claim 4, further comprising a plurality of auxiliary keys for switching frequently used ones of said commands and said data units, said auxiliary keys being positioned alongside said dial to allow simultaneous operation of said dial and at least one of said auxiliary keys by a single hand of said operator.

6. The improvement as defined in claim 5, wherein said at least one of said auxiliary keys operable simultaneously with said dial by said single hand is located adjacent to a left lower quadrant of said dial, is operable by a thumb of said single hand and is circular arc shaped and coaxial to said dial.

7. The improvement as defined in claim 6, further comprising a printed circuit board including at least a portion of said rotational transducer means including a pair of opto-couplers; and wherein said dial is knob shaped and has a top portion, said top portion comprising said flat circular elevated central portion and said substantially conical peripheral portion adjacent and connected to said central portion, and a lower cylindrical skirt extending downward from said substantially conical peripheral portion, said lower cylindrical skirt having a bottom edge spaced from said printed circuit board and having a plurality of slots in said bottom edge and a central shaft extending downward from said central portion, said shaft being engagable rotatably, but axially securable, in a bushing fixed to said supporting frame, wherein said opto-couplers are positioned on said printed circuit board so that said bottom edge of said lower cylindrical skirt passes through said opto-couplers when said dial is rotated.

8. The improvement as defined in claim 7, wherein said central shaft has a circumferential recess and said bushing has a resilient latch positioned to engage in said circumferential recess when said shaft is inserted in said bushing to hold said knob and allow rapid mounting and removing of said knob in said supporting frame.

9. A computer system comprising a keyboard including a plurality of keys mounted on a supporting frame, scanning and processing means for generating commands and data units in response to activations of said keys, communication means for transmitting said commands and said data units from said scanning and processing means, and a rotatable dial manually operable for production of sequences of repeated commands and data units, wherein said rotatable dial is rotatably mounted on said supporting frame and has a center, a rotation axis passing through said center and an exposed operating surface and said dial is rotatable by contact of at least one finger of an operator with said operating surface at a plurality of radial positions spaced from said center; transducer means for generating an output signal according to an angular rotation speed of said dial in predetermined incremental angular units; means for generating said sequences of said repeated commands and said data units from said output signal; at least two of said keys being positioned in the proximity of said dial so as to provide easy access of said keys; a plurality of auxiliary keys for switching frequently used ones of said commands and data units, said auxiliary keys being positioned alongside said dial so as to allow simultaneous operation of said dial and at least one of said auxiliary keys by a single hand of said operator; and means for modifying said sequences of said repeated commands and data units by activation of said keys when said dial is rotated by said operator.

* * * * *